United States Patent [19]
Rohe et al.

[11] 3,783,229
[45] Jan. 1, 1974

[54] DEVICE FOR PLASMA WELDING AND CUTTING

[75] Inventors: Josef Rohe, Frankfurt/Main-Schwanheim; Dieter Staacks, Sprendlingen, both of Germany

[73] Assignee: Messer Griesheim GmbH, Frankfurt/Main, Germany

[22] Filed: Aug. 2, 1972

[21] Appl. No.: 277,250

[30] Foreign Application Priority Data
Aug. 16, 1971 Germany............ P 21 40 968.7

[52] U.S. Cl............................................. 219/121 P
[51] Int. Cl............................................... B23k 9/06
[58] Field of Search................. 219/121 P, 131 R

[56] References Cited
FOREIGN PATENTS OR APPLICATIONS
1,910,398    11/1969   Germany.................. 219/121 P

*Primary Examiner*—J. V. Truhe
*Attorney*—Ernest F. Marmorek

[57] ABSTRACT

A device for plasma welding and cutting by means of a plasma torch or burner. A first current source is provided for feeding a pilot arc discharge. The negative pole of the current source is connected to the electrode of the burner while the positive pole is connected to the nozzle of the burner. A second current source feeds the main plasma arc discharge and its negative pole is connected to the burner electrode and the positive pole to the work piece. Specifically, the current branch of the second current source which connects to the work piece is bypassed by a bypass branch in such a manner that when the plasma main arc discharge current is closed the resulting peak current is diverted through this bypass branch.

5 Claims, 1 Drawing Figure

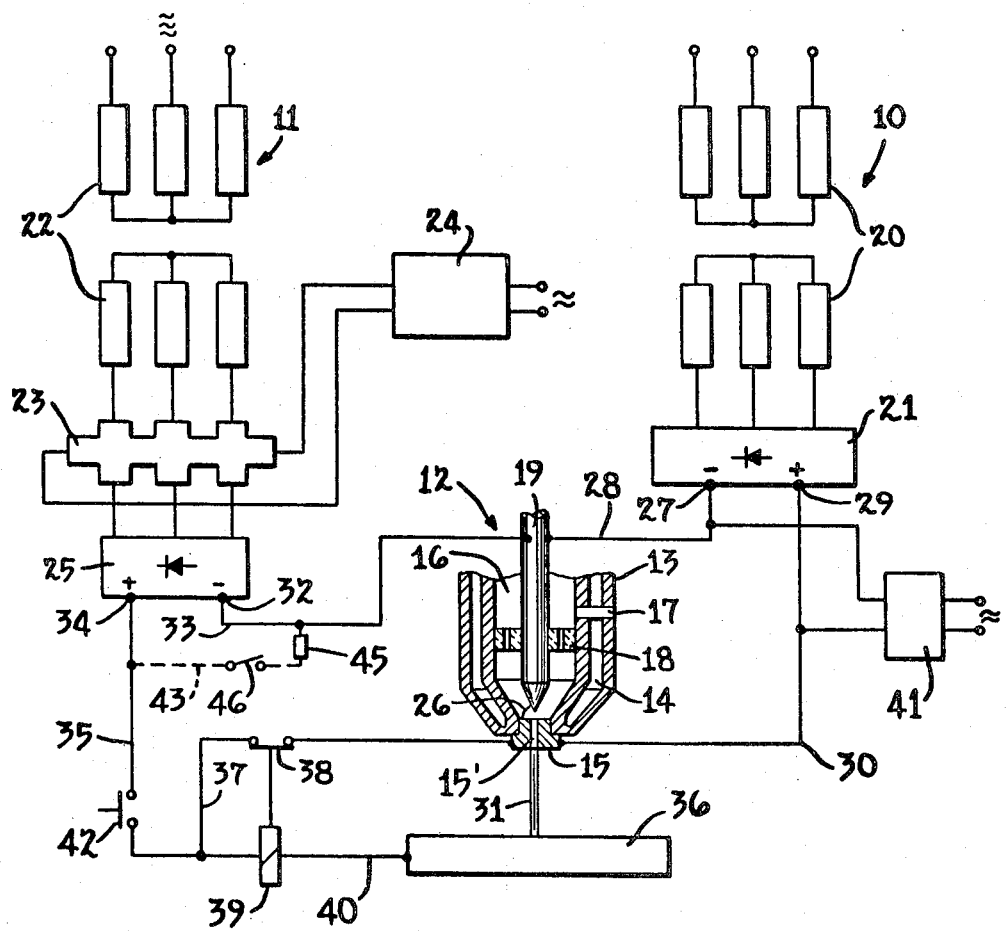

3,783,229

DEVICE FOR PLASMA WELDING AND CUTTING

BACKGROUND OF THE INVENTION

This invention relates generally to a device for plasma welding and cutting by means of a plasma torch or burner.

A device of this character is particularly useful for plasma welding. In such devices the pilot arc discharge is maintained in order to stabilize the main arc discharge during the entire welding process. In such devices it is conventional practice to use two current sources so that the pilot and the main arc discharge current do not influence each other.

During operation of such a plasma burner it has been found that if a nozzle is used which constricts the main arc discharge, the nozzle is subjected to the greatest load when the main arc is initiated. This can cause a sudden destruction of the nozzle, particularly in the region of the nozzle bore.

It has been found that this destruction of the nozzle is caused among others by the current peak which is generated when the current is closed for the main plasma arc discharge.

It is accordingly an object of the present invention to avoid the sudden destruction of the plasma nozzle when the main plasma discharge is initiated and to provide an optimum stability of the nozzle.

Another object of the present invention is to provide a plasma torch for welding or cutting which avoids the disadvantages of the prior art.

A further object of the present invention is to divert the current peak which is created when the main plasma arc discharge is initiated.

SUMMARY OF THE INVENTION

In accordance with the present invention the leads of the second current source which feeds the main plasma arc discharge are connected with a bypass branch in such a manner that when the main plasma arc discharge current is closed, the resulting current peak is diverted through this bypass branch.

By means of the suggestion in accordance with the present invention it is advantageously achieved that the resulting peak current does not cause any damage to the nozzle because the peak current is diverted by means of the bypass branch to the current source. This prevents the current peak from reaching the main arc discharge whereby a high current load of the nozzle and particularly the bore of the nozzle is avoided.

In accordance with the present invention it is further proposed that the bypass branch is connected at one end to the positive terminal and at the other end through the burner nozzle of the pilot arc discharge and the burner electrode with the negative terminal of the current source.

Accordingly, in this manner it is achieved that when the main arc discharge current is closed the resulting peak current is diverted.

Preferably, the invention is further extended by providing a contact in the bypass branch. This contact is operated in accordance with the present invention by a relay through which the current flows. Preferably, the relay is connected in the current branch of the second current source connected to the work piece. In this manner it is achieved that when the main arc discharge is initiated the current peak is diverted by means of a bypass branch connected to the burner nozzle. On the other hand, after operation of the relay, the contact is opened which interrupts the bypass branch. Preferably, the relay may be adjusted for different response times.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWING

The single FIGURE of the drawing is a circuit diagram of a device for plasma welding or cutting embodying the present invention.

DESCRIPTION OF THE PREFERRED EMBODIMENT

The device of the present invention as shown in FIG. 1 includes a first alternating current source 10, a second alternating current source 11 as well as a plasma torch or burner 12. The plasma burner 12 includes a burner body 13 which is provided with a cooling channel 14 as well as with a constriction nozzle 15 disposed at the head of the burner body. A central bore 16 of the burner body 13 is connected by an inlet 17 for the plasma gas such, for example, as argon, helium, hydrogen, nitrogen or a mixture thereof. An electrode 19 which consists essentially of tungsten is centered by a centering element 18 in the central bore 16, the element 18 consisting preferably of a ceramic.

The first alternating current source 10 consists of a transformer 20 and a rectifier 21.

The second alternating current source 11 includes a transformer 22, a transductor such as described, for example, in the British Pat. No. 937,477, a control device 24 for the transductor 23 as well as a rectifier 25 following the transformer.

The first current source 10 feeds a pilot arc discharge designated 26. To this end the negative terminal 27 of the first current source is connected by means of a lead 28 with the burner electrode 19. The positive terminal 29 of the current source is connected by means of a lead 30 with the burner nozzle 15. Connected to the lead 28 as well as to the lead 30 is a high frequency initiating device 41 which is not further disclosed and which may be of the type known from U.S. Pat. No. 3,551,741.

The second current source 11 feeds the main plasma discharge designated 31. The negative terminal 32 of this current source is connected by a lead 33 with the burner electrode 19, while the positive terminal 34 is connected by a lead 35 to the work piece 36.

In accordance with the present invention there is provided a bypass branch 37 for diverting the current peak which is created at the time of closing of the main plasma arc discharge current circuit. The bypass branch 37 is connected at one end to the positive terminal 34 of the second current source 11, that is to the lead 35 while its other end is connected by means of the nozzle body 15, the pilot arc discharge 26 and the burner electrode 19 with the negative terminal 32 by means of the lead 33. Disposed in the bypass branch 37 is a switch or contact 38 which in accordance with the present invention is operated by a relay 39. The relay 39 which may have an adjustable response time, is connected in the portion of the lead 40 of the second current source 11 connected with the work piece 36.

The device in accordance with the present invention operates as follows. Initially, by means of the inlet 17, the plasma gas is fed into the central bore 16, the gas leaving through the burner nozzle 15. Subsequently, by means of the high frequency initiating device 41, an arc is created by the nozzle 15 and the electrode 19 so that the pilot arc discharge 26 may flow through the leads 28, 30 to cross the current path. By means of this pilot arc discharge 26, the flowing plasma gas is dissociated and ionized and thereby made electrically conductive. When the electrically conductive gas stream hits the nozzle body the electric current for the main plasma arc discharge is closed by the electrode 19 and the work piece 36. Accordingly, after the switch 42 is closed the main arc discharge current may flow. The current peak created when the switch 42 is closed is diverted in accordance with the present invention through the bypass branch 37 to the current source 11. This avoids too high a current load of the nozzle and particularly of the nozzle bore 15'.

It is further possible for such a device to divert the initial current peak created when the second current source is connected by means of another bypass branch 43 shown in dotted lines. The bypass branch 43 is directly connected between the two leads 33 and 35. In this bypass branch 43 there may be provided a resistor 45 having a small ohmic resistance.

Further, in this bypass branch there is provided a switch 46 which is interrupted after the second current source has been connected by means of an additional relay not illustrated whereby the bypass branch 43 is interrupted.

What is claimed is:

1. Device for plasma welding and cutting of a work piece comprising:
   a. a plasma torch;
   b. a first current source having a positive terminal and a negative terminal for feeding the pilot arc discharge of said torch;
   c. a burner nozzle for said torch;
   d. said plasma torch having an electrode;
   e. the positive terminal of said first current source being connected to said burner nozzle;
   f. the negative terminal of said first current source being connected to said electrode;
   g. a second current source for feeding the main arc discharge, said second source having a negative terminal connected to said electrode and a positive terminal connected to the work piece; and
   h. a bypass branch for interconnecting the exit leads of said second current source so that the peak current created at the instant of closing the current circuit of the main plasma arc discharge is capable of being diverted through said bypass branch.

2. Device as defined in claim 1 wherein said bypass branch is connected with one end with the positive terminal of said second source and with its other end through said nozzle, the pilot arc discharge and said electrode with the negative terminal of said second source.

3. Device as defined in claim 2 wherein a switch is provided in said bypass branch.

4. Device as defined in claim 3 wherein a relay is provided for controlling said switch, said relay being disposed in the current branch connected to the work piece.

5. Device as defined in claim 4 wherein said relay has an adjustable response time.

* * * * *